J. HEBERLING.
MEASURING INSTRUMENT.
APPLICATION FILED OCT. 17, 1913.
1,156,998.
Patented Oct. 19, 1915.
2 SHEETS—SHEET 2.
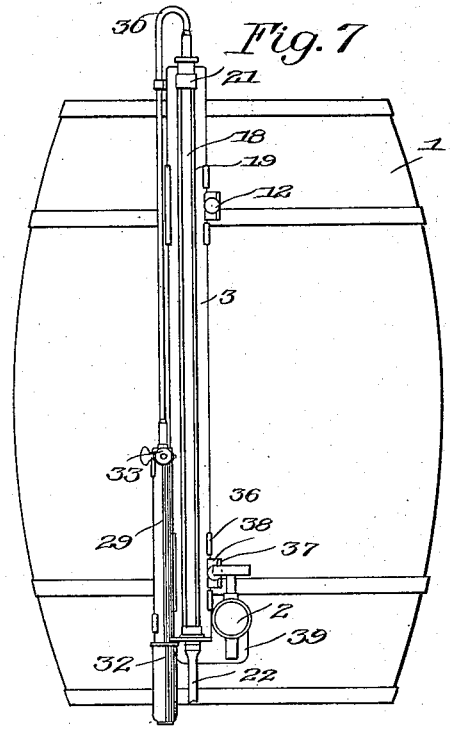
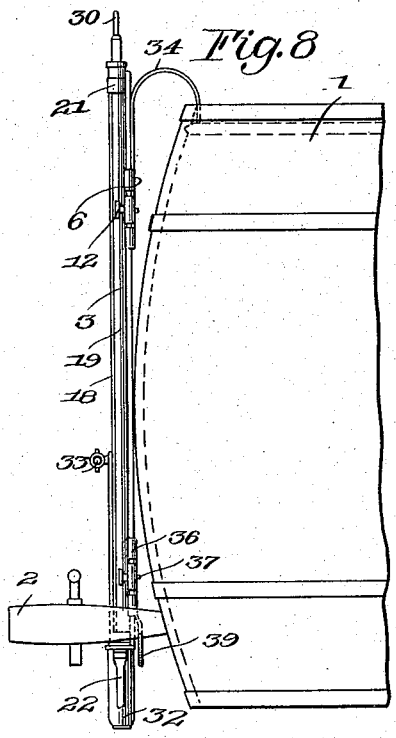
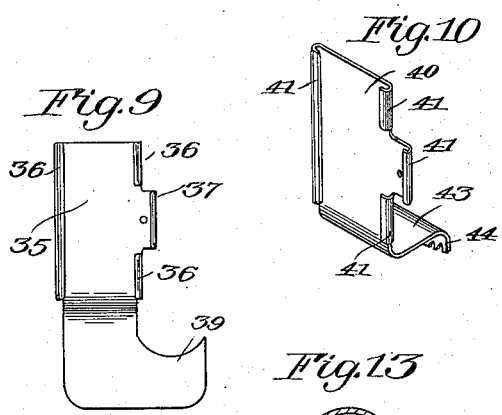
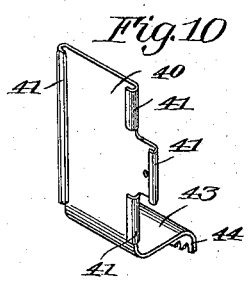
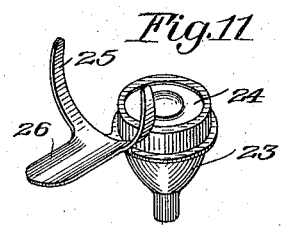
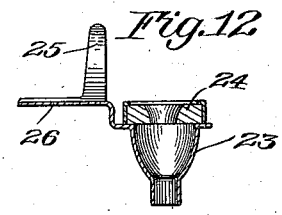
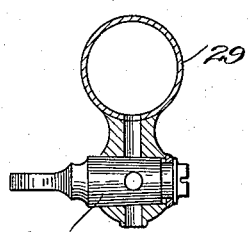
Witnesses
Ada W. Whitmore
Frances Jacobowitz
Inventor
John Heberling
H. H. Simms
his Attorney
By
COLUMBIA PLANOGRAPH CO., WASHINGTON, D. C.

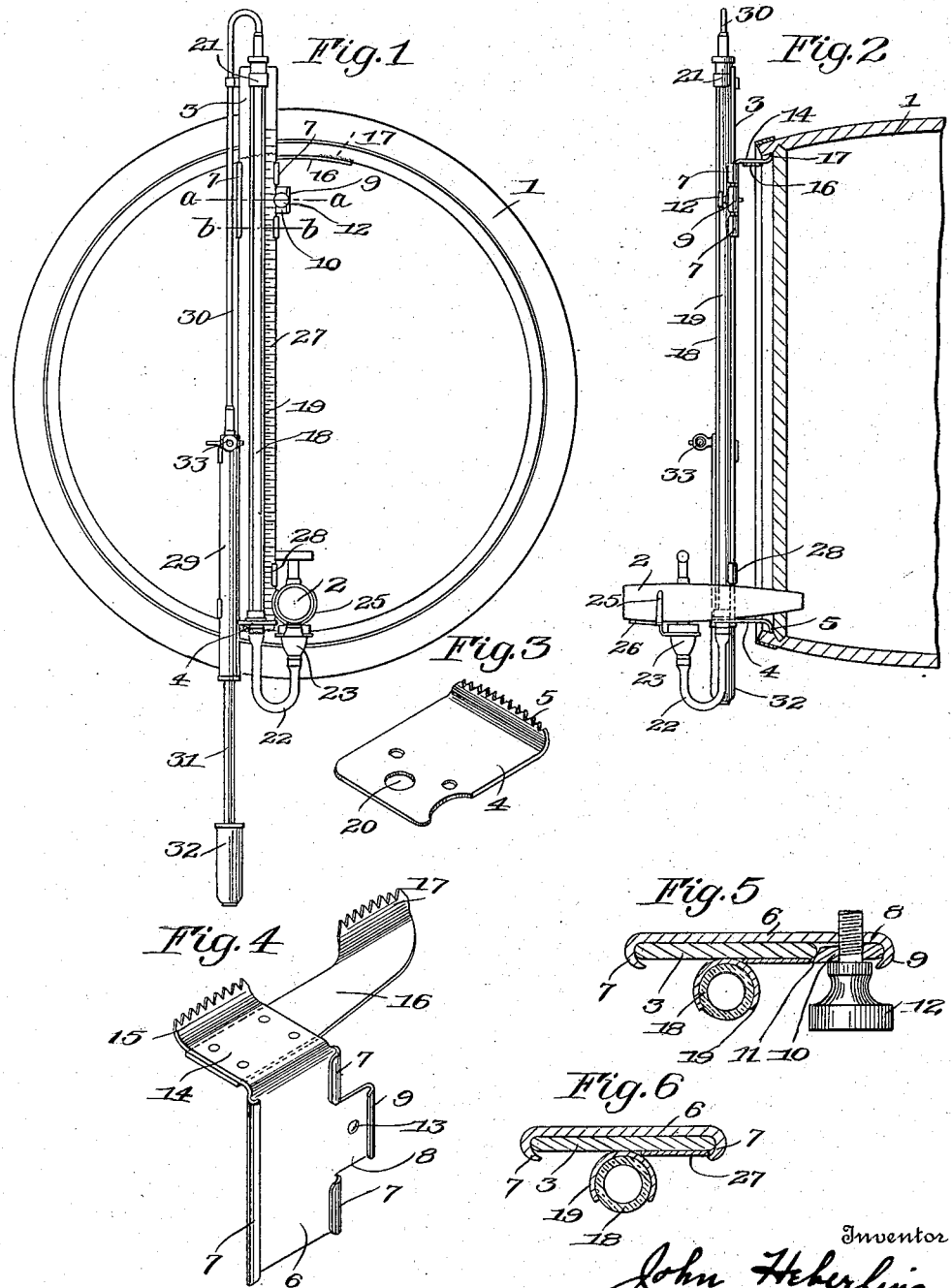

UNITED STATES PATENT OFFICE.

JOHN HEBERLING, OF ROCHESTER, NEW YORK.

MEASURING INSTRUMENT.

1,156,998. Specification of Letters Patent. Patented Oct. 19, 1915.

Application filed October 17, 1913. Serial No. 795,801.

*To all whom it may concern:*

Be it known that I, JOHN HEBERLING, of Rochester, in the county of Monroe and State of New York, have invented a new and useful Improvement in Measuring Instruments, which improvement is fully set forth in the following specification and shown in the accompanying drawings.

The present invention relates to measuring instruments for determining the amount of liquid within a keg, barrel or cask, and an object of the same is to provide a construction which may be readily attached to the outside of such containers to permit the liquid to rise in such instrument to the height of the liquid within the container, the instrument having a scale thereon for determining the amount of liquid within the container from the amount received by the measuring device and such scales being designed for containers of different sizes.

A further object of the invention is to provide means for discharging the liquid from the measuring instrument back into the container after the contents of such container have been measured so that the measuring device may be readily removed from the container and used to measure the contents of other containers without any waste of the liquids.

To these and other ends the invention consists in certain parts and combinations of parts all of which will be hereinafter described, the novel features being pointed out in the appended claims.

In the drawings: Figure 1 is an end view of a container with the measuring device applied thereto and the pump plunger withdrawn; Fig. 2 is a side view of the measuring device applied to a container which is shown in section, the pump plunger being moved into its cylinder; Fig. 3 is an inverted perspective view of one of the attaching devices of the measuring instrument; Fig. 4 is a perspective view of another of the attaching devices used in connection with the attaching device shown in Fig. 3; Fig. 5 is a section on the line a—a, Fig. 1; Fig. 6 is a section on the line b—b, Fig. 1; Fig. 7 is a front view of another embodiment of the invention attached to a barrel when the latter is upright, the air pump plunger being moved into the cylinder; Fig. 8 is a side view of the parts shown in Fig. 7; Fig. 9 is a front view of the lower attaching device; Fig. 10 is a perspective view of an attaching device which may be used in connection with the construction shown in Figs. 7 and 8 and the upper attaching device shown in Figs. 1 and 2 to adapt the construction shown in Figs. 7 and 8 for fitting a barrel supported on its side; Figs. 11 and 12 are detail views of the nipple used for attachment to the spigot or faucet; and Fig. 13 is a detail view of the air exhaust valve for the pump.

Referring first to the embodiment shown in Figs. 1 and 2, 1 indicates the container for the liquid to be measured, such container, in this instance, being a barrel supported on its side and having a spigot or faucet 2 projecting from its head. The measuring device is shown as supported from the chime of the barrel and to this end may comprise a supporting plate 3 having at its lower end an attaching device 4 rigid with the plate 3 and preferably in the form of a horizontally-arranged plate having a downwardly deflected portion 5 at its rear end, the free edge of said downwardly-deflected portion being serrated and curved to conform to the chime.

Another attaching device may be arranged near the upper end of the supporting member or plate 3 and preferably embodies a slide 6 having inwardly-turned flanges 7 along opposite edges to embrace the opposite edges of the plate 3, said slide having an extension 8 with a laterally-turned free edge 9 for receiving a clamping member 10 which, at one edge, is fulcrumed beneath the inwardly-turned portion 9, and, at the other edge, is beveled at 11 to bear against the edge of the supporting plate 3, a clamping screw 12 passing through the clamping plate 10 and the opening 13 in the extension 8 to draw the beveled edge 11 firmly against the edge of the supporting plate 3, in order to hold the slide 6 in its adjusted position. The slide 6 carries the attaching means which preferably is in the form of a rearward-extending arm 14 integral with the slide 6 and having an upwardly extending and serrated edge 15 which engages the chime of the barrel at a point opposite that portion engaged by the attaching member 4. As the two attaching devices 4 and 15 do not engage the barrel chime at its greatest diameter, it is desirable to provide some means which will prevent the lateral movement of the measuring instrument on the chime and to this end, a resilient arm 16 is extended laterally from the rearwardly-extended portion 14 and is provided near its free end with an upwardly and rearwardly-extending portion 17 having a serrated free edge. With this arrangement, after the portions 5, 15 and 17 engage with the chime, the portion 17 yields relatively to the portion 15 to conform to the curve of the chime, thus holding the measuring instrument on the barrel against lateral movement.

The measuring of the liquid may be effected by the provision of a vertically-arranged gage tube 18 made of glass or other transparent material and supported within a segmental tubular casing 19 which is secured at its lower end within the opening 20 of the plate 4 and its upper end to a sleeve 21 attached to the support 3. To the lower end of the tube 18, a flexible rubber tubing 22 is secured and at the outer end of this flexible tubing 22, a socket member 23 is arranged having a yielding or resilient washer 24 which is adapted to fit over the discharge of the spigot or faucet 2 in order to connect the gage tube to the container to be measured.

The socket member carries a guide piece which is in the form of an upwardly opening U-shaped member 25 arranged to one side of the socket member and having a lateral extension 26 at its base to coöperate with the under side of the faucet. This guide piece is provided to prevent the twisting of the flexible connection which has its nipple secured to the rotating discharge nozzle of the faucet and which would otherwise turn with the turning of the discharge nozzle in the opening and the closing of the faucet.

It is apparent that, when the spigot or faucet 2 is opened, liquid will flow from the container 1 through the faucet into the flexible tube 22 and by way of the latter to the gage tube 18. It is apparent also that the height of the liquid in the gage tube will be the same as the height of the liquid within the container 1 so that the contents of the container may be measured by this gage tube, this being effected by a scale 27 arranged on a removable strip which at one edge lies beneath the segmental tube 19 and at the other edge lies beneath the flanges 7 on the slide 6 and the flange 28 on the support 3, thus being held to the support 3 with its lower end resting upon the plate 4 and being removable by withdrawing the same upwardly so that other scales for other barrels of different sizes may be used with the instrument.

It is desirable to provide some means for forcing the liquid back into the container 1 after a measurement in order that the measuring instrument may be removed and attached to another container and, to this end, the measuring instrument may be provided with an expelling means such as an air pump comprising a cylinder 29 secured to the support 3 near the lower end of the latter so as to project slightly below the same and lying parallel to the gage tube. This cylinder connects by a rigid tubing 30 with the upper end of the gage tube 18 so as to communicate the air pressure within the cylinder to the upper end of the gage tube and thus forces the contents of the tube back into the container 1 by way of the flexible tubing 22. A plunger 31, having a hand piece 32, operates within the cylinder for creating air pressure therein, and near its upper end a cylinder is provided with a manually operable valve 33 by which air may be admitted to the connection between the pump and the gage tube in order that atmospheric pressure may be maintained within the gage tube when the latter is being filled with the contents of the container 1.

In using the embodiment shown in Figs. 1 and 2, the instrument is first attached to the container, the valve 33 is opened, and the plunger 31 drawn downwardly, thus permitting atmospheric pressure to exist within the gage tube 18. The valve of the faucet or spigot 2 is now opened permitting the liquid to flow by way of the flexible tube into the gage tube. The scale is now read to ascertain the amount of liquid within the container and then the valve 33 is turned to close the tube 30 against the escape of air. Upon the upward movement of the plunger 31, the liquid within the gage tube 18 is forced back into the container 1 and upon the closing of the faucet 2, the measuring instrument may be removed.

In the embodiment of the invention shown in Figs. 7, 8 and 9, all of the parts are constructed the same as the embodiment shown in Figs. 1 and 2 except the attaching means, the latter being changed to adapt the measuring instrument for attachment to a barrel, cask or keg resting upon one end with the faucet projecting from the side of the barrel. In this embodiment, the slide 6 is formed with an upwardly, rearwardly and downwardly extending hook 34 adapted to rest upon the head and to be engaged by the chime at its side as will be seen by referring to Fig. 8. The lower attaching member is in the form of a slide 35 having laterally-turned edges 36 for coöperating with the opposite edges of the support 3 and an extension 37 for the clamping device 38 which operates like the clamping device 10 of the embodiment shown in Figs. 1 and 2. Arranged on the slide 35 is a laterally-extending hook member 39 adapted to engage beneath the faucet or spigot 2 so as to hold the lower end of the measuring instrument against movement. As this lower hook 39, which engages the faucet, is adjustable, it is possible to arrange the lower end of the gage in any suitable relation to the bottom of the container 1, this being necessary as the faucets are liable to be at different distances from the bottoms of the containers. The operation of this embodiment is the same as that shown in Figs. 1 and 2 except that the scale will have to be changed to correspond with the size and the upright arrangement of the container.

In Fig. 10 is shown an attaching device which may be substituted for the attaching device shown in Fig. 9, the attaching device at the upper part of the embodiment shown in Figs. 7 and 8 being replaced by an attaching device such as shown in Fig. 4. With this arrangement, a measuring instrument such as shown in Figs. 7 and 8 could be attached to the end of the barrel, thus permitting a single instrument to be used for two purposes upon the changing of the attaching devices and the scales. The attaching device shown in Fig. 10 embodies a sliding portion 40 having laterally-turned flanges 41 and an extension 42 for the clamping device 43 which operates like the clamping device 10 shown in Figs. 1 and 2. Arranged on the slide 40 is a rearwardly-extending arm 43 which has its free edge 44 turned downwardly and serrated to engage the chime of the barrel.

From the foregoing, it will be seen that there has been provided a measuring instrument which may be attached to any barrel, cask or keg and connected with the spigot or faucet thereof without providing any special attachment on the container or its faucet. The instrument may discharge its contents in order that it may be attached to and removed from any suitable number of containers, thus making it necessary for the liquor dealer to purchase only one instrument for measuring the contents of his different containers, the instrument having a removable scale which may be replaced by others to correspond with the size and position of the container.

What I claim as my invention and desire to secure by Letters Patent is:

1. A measuring instrument of the class described comprising a gage tube, means for connecting said gage tube to a container to receive liquid from such container, means for expelling liquid from said gage tube into the container by way of said connecting means and a valve for opening or closing the upper end of the gage tube to permit the escape of air from the tube during the gaging operation and to prevent the escape of air during the expelling operation.

2. A measuring instrument of the class described comprising a gage tube, means for connecting the lower end of said gage tube with a container whose contents is to be measured, expelling means connected to the upper end of said gage tube to expel the contents of the gage tube into the container by way of the connecting means and a valve interposed between the expelling means and the tube to open and close the tube in order to permit the escape of air during the gaging operation and to prevent the escape of air during the expelling operation.

3. In a measuring instrument, the combination with a gage tube, of a socket member having a flexible connection with the lower end of the gage tube, an air compressor connected to the upper end of the gage tube to expel liquid from the gage tube and a valve for permitting the escape of air from the gage tube during the gaging operation and for closing the tube against the escape of air during the expelling operation.

4. A measuring instrument of the class described comprising a gage tube, means connecting the lower end of said gage tube with a container whose contents is to be measured, and a pump having connection with the upper end of the gage tube, said connection being provided with a valve to permit atmospheric pressure to be obtained within the top of the gage tube.

5. A measuring instrument of the class described comprising a suitable support, a gage tube arranged on said support, means for connecting the lower end of said tube with a container whose contents is to be measured, a pump having its cylinder secured to the support parallel with and near the lower end of the gage tube, and a connection between the upper end of the pump cylinder and the upper end of the gage tube.

6. A measuring instrument comprising a gage tube, a flexible connection having one end secured to the gage tube, a socket device secured to the other end of the flexible connection and having a resilient portion to form a liquid tight joint with the discharge of a spigot faucet, means for anchoring said socket device to the spigot faucet at one side of the discharge to prevent the turning of the socket device, said means being formed to interlock automatically with the faucet as the socket piece is fitted to the discharge portions, and means for supporting the gage tube independently of the connection with the faucet.

7. A measuring instrument of the class described comprising a gage tube, a flexible connection having one end attached to the gage tube, a socket device having a resilient portion to form a liquid tight joint with the discharge of a spigot faucet said device being connected to the other end of the flexible connection, a U-shaped portion opening upwardly to one side of the socket device to engage the faucet at one side of the discharge as the socket piece is fitted to the discharge, and means for supporting the gage tube independently of the flexible connection.

8. A measuring instrument of the class described comprising a supporting plate, a gage tube arranged thereon, means for connecting the lower end of the gage tube to the discharge of a container whose contents is to be measured, an attaching plate secured to the lower end of the supporting plate and having the gage tube connected thereto, said attaching plate extending rearwardly from the supporting plate and having its free edge turned downwardly, and an adjustable attaching member near the upper end of the supporting plate.

9. A measuring instrument of the class described comprising a gage tube, means for connecting the lower end of the gage tube with a container whose contents is to be measured, and two relatively adjustable attaching devices, connected with the gage tube, one of said devices having a portion extending downwardly and the other of said devices having a portion extending upwardly, said portions being adapted to engage the chime of a barrel, keg or cask.

10. A measuring instrument of the class described comprising a gage tube, means for connecting the lower end of the gage tube with a container whose contents is to be measured, and two relatively adjustable attaching devices, one of said devices having two portions, one of which is mounted to yield relatively to the other.

11. A measuring instrument of the class described comprising a gage tube, means for connecting the lower end of the gage tube to a container whose contents is to be measured, and two relatively adjustable attaching devices, the lower of said devices having a portion extending downwardly, and the upper of said devices having two portions extending upwardly, one of said upwardly-extending portions being mounted to yield relatively to the other.

12. A measuring instrument of the class described comprising a gage tube, means for connecting the lower end of the gage tube to a container whose contents is to be measured, a supporting plate for the gage tube, and two relatively adjustable attaching devices, one of said devices embodying a slide having flanges at opposite edges for coöperating with opposite edges of the supporting plate, one edge of the slide being provided with an extension with a turned edge and a clamping member fulcrumed beneath said turned edge and coöperating with one edge of the supporting plate to hold the slide in its adjusted position.

13. A measuring instrument of the class described comprising a gage tube, means for connecting the lower end of the gage tube to a container whose contents is to be measured, a supporting plate for the gage tube, and a pair of attaching devices, one of which is adjustably mounted and embodies a slide having turned flanges at its opposite edges for coöperating with the opposite edges of the plate, an extension at one edge having a turned edge, a clamping piece fulcrumed beneath said extension to coöperate with an edge of the supporting plate, and an arm extending rearwardly from said slide and having its free end turned and serrated.

14. A measuring instrument of the class described comprising a gage tube, means for connecting the lower end of the gage tube to a container whose contents is to be measured, a supporting plate for the gage tube, and a pair of slides adjustably mounted on the supporting plate, one of said slides carrying a rearwardly and downwardly extending hook for coöperating with one end of a barrel or container and the other of said slides carrying a laterally extending hook for coöperation with a faucet extending from the side of a barrel.

JOHN HEBERLING.

Witnesses:
 HAROLD H. SIMMS,
 ADA M. WHITMORE.

Copies of this patent may be obtained for five cents each, by addressing the "Commissioner of Patents, Washington, D. C."